US006491745B1

(12) United States Patent
Ashizawa

(10) Patent No.: US 6,491,745 B1
(45) Date of Patent: Dec. 10, 2002

(54) WATER/OIL REPELLENT COMPOSITION

(75) Inventor: Masahiro Ashizawa, Kanagawa (JP)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/700,499

(22) PCT Filed: May 7, 1999

(86) PCT No.: PCT/US99/10035

§ 371 (c)(1),
(2), (4) Date: Nov. 9, 2000

(87) PCT Pub. No.: WO99/58728

PCT Pub. Date: Nov. 18, 1999

(51) Int. Cl.$^7$ .............................. C14C 9/00; C08K 9/10

(52) U.S. Cl. .......................... 106/2; 252/8.57; 252/8.61; 523/169; 106/3; 106/4; 106/5; 106/6; 106/7; 106/8; 106/9; 106/10; 106/11; 106/287.1; 106/287.11; 106/287.12; 106/287.13; 106/287.14; 106/287.16; 106/287.6; 106/287.28; 106/271

(58) Field of Search ............................... 252/8.57, 8.61; 523/169; 106/2, 3, 4, 5, 6, 7, 8, 9, 10, 11, 287.1, 287.11, 287.12, 287.13, 287.14, 287.15, 287.6, 287.28, 271

(56) References Cited

U.S. PATENT DOCUMENTS

| | | | | |
|---|---|---|---|---|
| 3,806,260 A | | 4/1974 | Miller | 401/7 |
| 3,870,542 A | | 3/1975 | Ida et al. | 117/33.3 |
| 5,998,541 A | * | 12/1999 | Ogawa et al. | 106/3 |
| 6,013,323 A | * | 1/2000 | Klayder et al. | 106/3 |

FOREIGN PATENT DOCUMENTS

| | | |
|---|---|---|
| EP | 0748659 | 12/1966 |
| EP | 0 140 525 B2 | 8/1994 |

* cited by examiner

*Primary Examiner*—C. Melissa Koslow
(74) *Attorney, Agent, or Firm*—Alan Ball; Gerald F. Chernivec

(57) ABSTRACT

The object is to provide a water/oil repellent composition which can simultaneously perform a water/oil treatment and a polishing treatment to leather products such as leather shoes, etc., by using one water/oil repellent composition, and can also exert excellent water/oil repellent effect and excellent polishing effect. It is constituted so that microcapsules, in which a polishing agent is encapsulated, are dispersed in a water/oil repellent agent.

7 Claims, 1 Drawing Sheet

WATER/OIL REPELLENT COMPOSITION

DETAILED DESCRIPTION OF THE INVENTION

The present invention relates a water/oil repellent composition, more particularly to a water/oil repellent composition containing microcapsules in which a polishing agent is encapsulated. When the water/oil repellent composition of the present invention is used in a waterproofing treatment of leather products such as leather, etc., a water/oil repellent agent can permeates through leather to exert satisfactory water repellency and oil repellency. Also, when the leather surface is polished by using a dry cloth after permeation of the water/oil repellent agent and further drying, excellent gloss, i.e. polishing effect can be exerted.

PRIOR ART

To impart the water repellency and oil repellency to leather products, a method of dissolving a water/oil repellent component such as fluororesin, etc. in a solvent, applying the resultant on leather, followed by drying to evaporate the solvent has generally been used, heretofore. To further improve the resulting water repellency and oil repellency in such a water/oil repellent composition, various compositions have been suggested. For example, the present applicant has suggested a composition for treating leather, a woven fabric and a cellulose material to impart high water/oil repellency to them, comprising (i) a fluorochemical compound represented by the formula: RF-Q-A [wherein Rf represents a fluoro aliphatic portion, A represents an aliphatic portion and Q represents an organic group] and (ii) a vehicle, in Japanese Patent Publication No. 2516889. When this water/oil repellent composition is used in the treatment of leather, not only durable water/oil repellency is imparted to leather, but also there can be obtained such an effect that an adverse effect is not exerted on appearance, touch, hand feeling and other desirable qualities of leather.

To exert the polishing effect in leather products such as leather shoes, etc. various polishing agents such as solid wax, paste, emulsion, etc. have hitherto been suggested. In case of all these conventional polishing agents, the polishing effect is obtained by directly applying them on the leather surface and polishing the leather surface using a drying cloth.

Furthermore, a method used exclusively to simultaneously exert the water/oil repellent effect and polishing effect in the leather products includes a method of using a two-component composition, i.e. a method of applying a solvent water/oil repellent agent product first, drying and wiping it by using a cloth and then applying a polishing agent and polishing by using a dry cloth. In this method, an operation of two steps is essential and long labor hour is required. Therefore, it is desired to provide a water/oil repellent agent product capable of treating in one step.

As the water/oil repellent agent product capable of treating in one step, a product obtained by directly adding silicone oil to the water/oil repellent composition is placed on the market. However, sufficient effect can not be obtained in view of the polishing effect and a further improvement is desired.

An object of the present invention is to solve the above problems of the prior art, and to provide a water/oil repellent composition which can simultaneously perform a water/oil treatment and a polishing treatment to leather products such as leather shoes, etc., by using one water/oil repellent composition, and can also exert excellent water/oil repellent effect and excellent polishing effect without requiring long time in the treatment.

The present inventors have intensively studied to accomplish the above object. As a result, the present inventors have found that the expected effect can be accomplished by dispersing microcapsules, in which a polishing agent is encapsulated, in a water/oil repellent agent in a water/oil repellent composition containing the water/oil repellent agent as a main component.

As described above, the water/oil repellent composition of the present invention contains a water/oil repellent agent as a main component, particularly characterized in that microcapsules, in which a polishing agent is encapsulated, are uniformly dispersed in the water/oil repellent agent.

In the present invention, since the encapsulized polishing agent is dispersed in the water/oil repellent agent, it is possible to avoid the following disadvantages caused by directly dispersing the polishing agent in the water/oil repellent agent. That is, when the water/oil repellent agent permeates through leather, the polishing agent permeates through leather, simultaneously, and it becomes impossible to apply a sufficient amount of the polishing agent on the leather surface. Accordingly, the polishing effect can not be expected. And besides, the polishing agent penetrated through leather, together with the water/oil repellent agent, inhibits the water/oil repellency. Furthermore, when the amount of the polishing agent in the composition added increases, the phase separation occurs. When the phase separation has occurred, it becomes impossible to uniformly apply the composition to the leather products any longer.

Accordingly, the microcapsules, in which the polishing agent is encapsulated, used in the water/oil repellent composition according to the present invention are not specifically limited, as far as the above disadvantages are avoided. That is, the polishing agent-encapsulated microcapsules are not specifically limited as far as the polishing agent encapsulated in the microcapsules does not elute in a solvent contained in the water/oil repellent composition and a protective film of the microcapsules is stable in the solvent. For example, the protective film constituting the microcapsules is preferably a film of a polycondensate formed by polymerization, more preferably a film of a polycondensate such as aminoplast resin, etc. Among these films, a urea-formaldehyde condensate can be advantageously used. The polishing agent-encapsulated microcapsules can be formed by utilizing a publicly known encapsulization technique.

The polishing agent to be encapsulated in the microcapsules includes normal polishing agents, and is not specifically limited as far as the polishing effect is exerted. Taking the process of encapsulization into consideration, it is necessary that the polishing agent must be oil-soluble. Preferred examples thereof include paraffin wax, silicone oil, wax, natural fats and oils, but are not limited thereto. Such a polishing agent is normally used in the amount of 50 to 99% by weight based on the total weight of the microcapsules.

The shape and size of the microcapsules vary widely, but is preferably spherical. The size, particularly diameter (outer diameter of the protective film) is normally within the range from 50 to 2500 $\mu$m, preferably from 100 to 1500 $\mu$m. When the size of the microcapsules is too large, the microcapsules are broken only by applying a small pressure and the contents come out inadvertently. On the other hand, when the size is too small, the strength of the film is too strong and, therefore, the contents can not come out only by applying a moderate pressure. When the size of the microcapsules is too large or too small, uniform dispersion of the microcapsules can not be accomplished.

The polishing agent-encapsulated microcapsules are used in the water/oil repellent composition in the amount which satisfies the amount of the polishing agent required in single application of the water/oil repellent composition, or which secures to apply a desirable amount of the polishing agent on the leather products.

Furthermore, according to the present inventors' knowledge, the water/oil repellent agent used as the main component is preferably thickened so as to accomplish uniform dispersion of the microcapsules in the water/oil repellent composition. Examples of a suitable thickening means include use of dispersing agents such as thickener, etc., in combination. Examples of a suitable thickener include a polymer compound, which is soluble in the solvent or can be swollen in the solvent, and a compound, which can form a pseudo-network by ion bonding, for example, mixture of a polyvalent metal and an alkyl acidic phosphate, but are not limited thereto.

The water/oil repellent agent, in which the polishing agent-encapsulated microcapsules are dispersed, is not specifically limited as far as the water/oil repellent agent can dissolve in the solvent and does not cause an adverse effect such as discoloration, etc. when applying on leather and, furthermore, sufficient water/oil repellency can be imparted. Examples of a suitable water/oil repellent agent include fluorine-contained acrylic copolymer, reaction product of fluorine-contained alcohol and fatty acid, perfluoroethylene oxide multimer, etc. Such a water/oil repellent agent is normally used in the state of being dissolved in an organic solvent. Examples of a suitable organic solvent include chlorinated hydrocarbon such as tetrachloroethane, trichloroethane, etc., hydrocarbon solvent such as isoparaffin hydrocarbon, etc., alcohols such as isopropyl alcohol, etc., ketones such as methyl ethyl ketone, etc., or a mixture thereof.

The water/oil repellent composition of the present invention may contain additives, which are normally used, such as softeners, antioxidants, nutrients, perfumes, antibacterial agents, antifungal substances, deodorants, etc., if necessary, in addition to the water/oil repellent agent as the main component and polishing agent-encapsulated microcapsules. The amount of these additional active components and additives added can vary widely according to the desired results.

The water/oil repellent composition of the present invention can be applied by various procedures when using in the treatment of leather products such as leather shoes, etc. For example, a preferred procedure is shown below. First, the water/oil repellent composition is applied on the surface of the leather product to permeate the water/oil repellent component through leather. In this applying operation, an applying means such as brush, etc. may be used. Alternatively, an applying means (e.g. sponge, etc.) attached to the top portion of a vessel containing the water/oil repellent composition may be preferably used. As a result of permeation of the water/oil repellent composition, excellent water/oil repellency can be imparted to leather. At this stage, almost all of the polishing agent-containing microcapsules in the water/oil repellent composition are remained on the leather surface. After the solvent is evaporated or dried, the polishing agent-containing microcapsules remained on the leather surface are broken by rubbing with a dry cloth to release the encapsulated polishing agent on the leather surface. At the same time, by rubbing the released polishing agent with the same dry cloth as that used in the previous operation, remarkable gloss can be imparted to the leather surface.

The present invention will be described in more detail with reference to the following examples. It will be appreciated that the present invention is not limited to the following examples.

EXAMPLE 1

Preparation of Polishing Agent-encapsulated Microcapsules 215 g of a urea-formaldehyde precondensate, 71 g of water and 29 g of sodium sulfate were charged in a reactor made of stainless steel, and the contents were stirred. Under vigorous stirring, 0.05 g of carboxylmethylcellulose was further added as a thickener. Then, 104 g of silicone oil (trade name: "KF96-500", manufactured by Shinetsu Kagaku Kogyo Co., Ltd.) was added as a polishing agent. In that case, stirring was performed while controlling the temperature and mixing rate, accurately. An aqueous citric acid solution was added to adjust the pH of the contents to 6. The formed microcapsules were separated by filtration, washed and further dried. As a result, generally spherical silicone oil-encapsulated microcapsules having an average diameter of 423 $\mu$L m were obtained.

Preparation of Water/Oil Repellent Composition

As a water/oil repellent agent, a commercially available Scotchgard™ water/oil repellent agent (manufactured by Minnesota Mining and Manufacturing Company of St. Paul, Minn.) was used. This waterproofing gel contains a fluororesin, a hydrocarbon solvent, a mineral oil and a thickener as a main component.

The silicone oil-encapsulated microcapsules prepared in the former step were incorporated into the prepared waterproofing gel for leather, Scotchgard™ in different amount (1.0, 3.0, 5.0 and 10.0 parts by weight) as described in Table 1 below, and then uniformly dispersed with mixing. As a result, a clear amber gel, in which the microcapsules are uniformly dispersed, was obtained. The following Table 1 shows the results obtained by visually evaluating the stability of the formulation in this preparation step.

Evaluation of Water/Oil Repellent Composition

To evaluate the performance of the resulting water/oil repellent composition, natural cow leather having smooth surface (30 cm×30 cm) was prepared as a leather sample. With paying attention so that the microcapsules are not broken, the test water/oil repellent composition was applied on the smooth surface of the leather sample and then air-dried over about 1 hour. After the stickiness on the surface of the leather sample disappeared, the microcapsules were broken while rubbing the portion with a dry cloth. While rubbing with the cloth, gloss is put on the leather surface. The degree of gloss (glossiness) varied depending on the amount of the microcapsules added.

In this example, a change in glossiness of the leather surface was measured by using a commercially available gloss meter, micro-TRI-gloss (trade name, manufactured by Gardener Co.). The accompanied FIG. 1 is a graph showing a relationship between the amount of microcapsules added and the change in glossiness (increase in glossiness in case that the glossiness of the surface of the leather sample before treatment is 100). As is apparent from this graph, it is possible to improve the glossiness with the increase of the amount of the microcapsules added.

Comparative Example 1

The procedure described in Example I was repeated, except that silicone oil (trade name "KF96- 10000", manufactured by Shinetsu Kagaku Kogyo Co., Ltd.), whose polishing effect is expected to be better than that of the silicone oil-encapsulated microcapsules, was directly incorporated into a waterproofing gel for leather, Scotchgard™ and then uniformly dispersed with mixing, for comparison. Also in this example, the amount of silicone oil added was 1.0, 3.0, 5.0 or 10.0 parts by weight.

In the same manner as described in Example 1, the stability of the formulation of silicone oil in this example was visually evaluated. As a result, the results as described in Table I below were obtained. In the same manner as described in Example 1, a relationship between the amount of silicone oil added and the change in glossiness was determined. As a result, a graph as shown in the accompanied FIG. 1 was obtained. In this example, high change in glossiness can be accomplished by adding a comparatively small amount of silicone oil because of excellent polishing effect of silicone oil used. And besides, the same or better effect can be accomplished by increasing the amount of the microcapsules added even in case of Example 1.

TABLE 1

| Amount of capsule Or silicone oil (parts by weight) | Example 1 | Comparative Example 1 |
|---|---|---|
| 1.0 | o | o |
| 3.0 | o | o |
| 5.0 | o | X |
| 10.0 | o | X |

o: Clear amber gel is formed.
X: Phase separation occurred.

As described above, according to the present invention, a water/oil treatment and a polishing treatment to leather products such as leather shoes, etc. can be simultaneously performed by using one water/oil repellent composition. Accordingly, not only long time is not required to the treatment, but also there is such an effect that both of the resulting water/oil repellent effect and polishing effect can be improved to excellent level.

Figure 1:
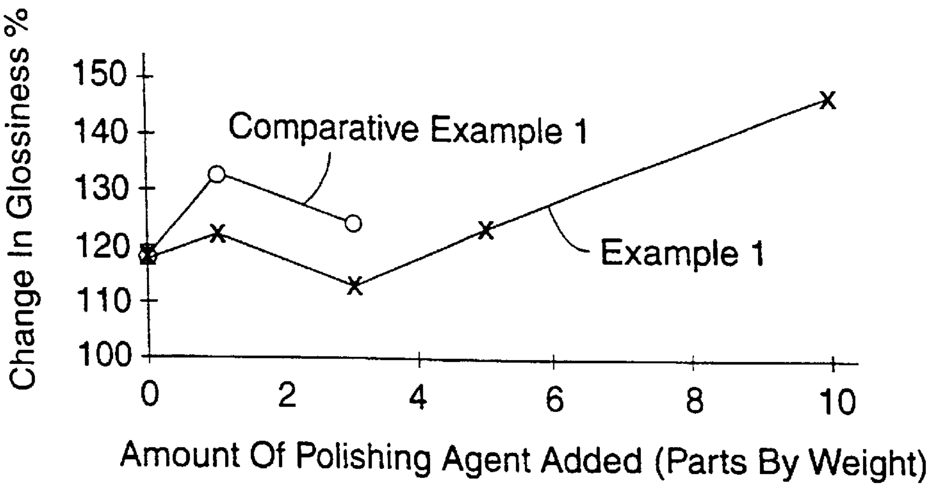
FIG. 1 is a graph showing a relationship between the amount of a polishing agent added and the change in glossiness.

What is claimed is:

1. A water/oil repellent composition for application to a porous substrate, said water/oil repellent composition comprising:

a water/oil repellent agent as a main component containing a fluorochemical component; and a plurality of microcapsules dispersed in said water/oil repellent agent, said microcapsules containing a polishing agent, said water/oil repellent composition capable of being absorbed by said porous substrate leaving said microcapsules of said polishing agent as a separated layer at the surface of said porous substrate.

2. The water/oil repellent composition of claim 1, wherein said porous substrate is leather.

3. The water/oil repellent composition of claim 1, wherein said fluorochemical component is selected from the group consisting of a fluorine containing acrylic copolymer, a reaction product of a fluorine-containing alcohol and a fatty acid, and a perfluoroethylene oxide multimer.

4. The water/oil repellent composition of claim 1, wherein said water/oil repellent agent further includes an organic solvent selected from the group consisting of hydrocarbon solvents, cblorohydrocarbon solvents, alcohol solvents, ketone solvents and mixtures thereof.

5. The water/oil repellent composition of claim 1, wherein said microcapsules have a size range from about 50 $\mu$m to about 2500 $\mu$m.

6. The water/oil repellent composition of claim 1, wherein said polishing agent is selected from the group consisting of paraffin wax, silicone oil, wax, and natural fats and oils.

7. A non-aqueous water/oil repellent polish for application to a leather substrate, said water/oil repellent polish consisting essentially of:

a water/oil repellent agent as a main component containing a fluorochemical component;

a plurality of microcapsules dispersed in said water/oil repellent agent, said microcapsules containing a polishing agent, said water/oil repellent composition capable of being absorbed by said leather substrate leaving said microcapsules of said polishing agent as a separated layer to release polish at the surface of said porous substrate.

* * * * *